Aug. 13, 1940.   C. M. TUMEY   2,211,447
ROTARY ENGINE
Filed Dec. 18, 1937   6 Sheets-Sheet 6
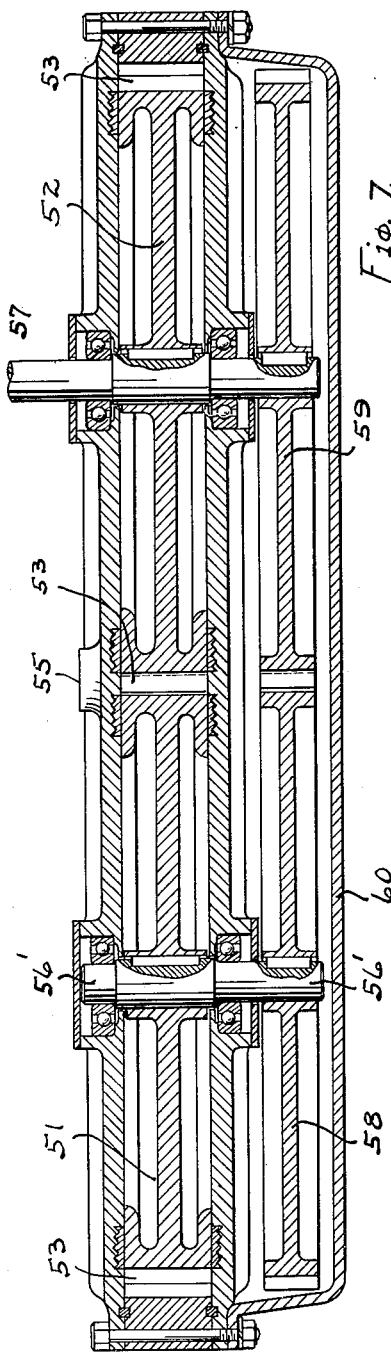
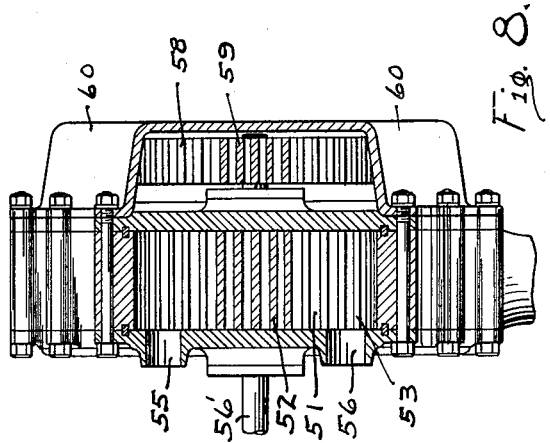
Inventor
Charles M. Tumey,
By Minturn & Minturn,
Attorneys Patented Aug. 13, 1940

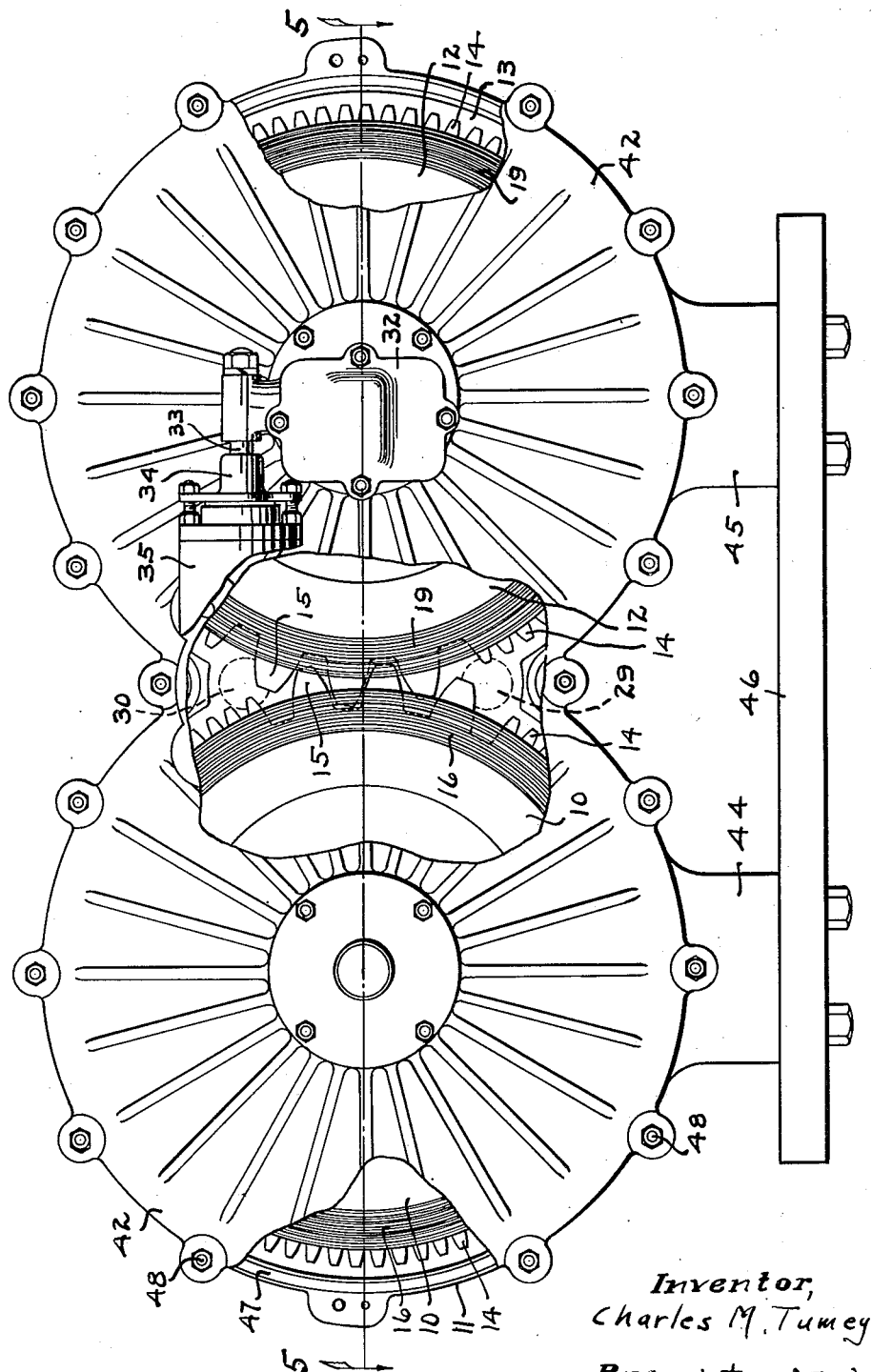

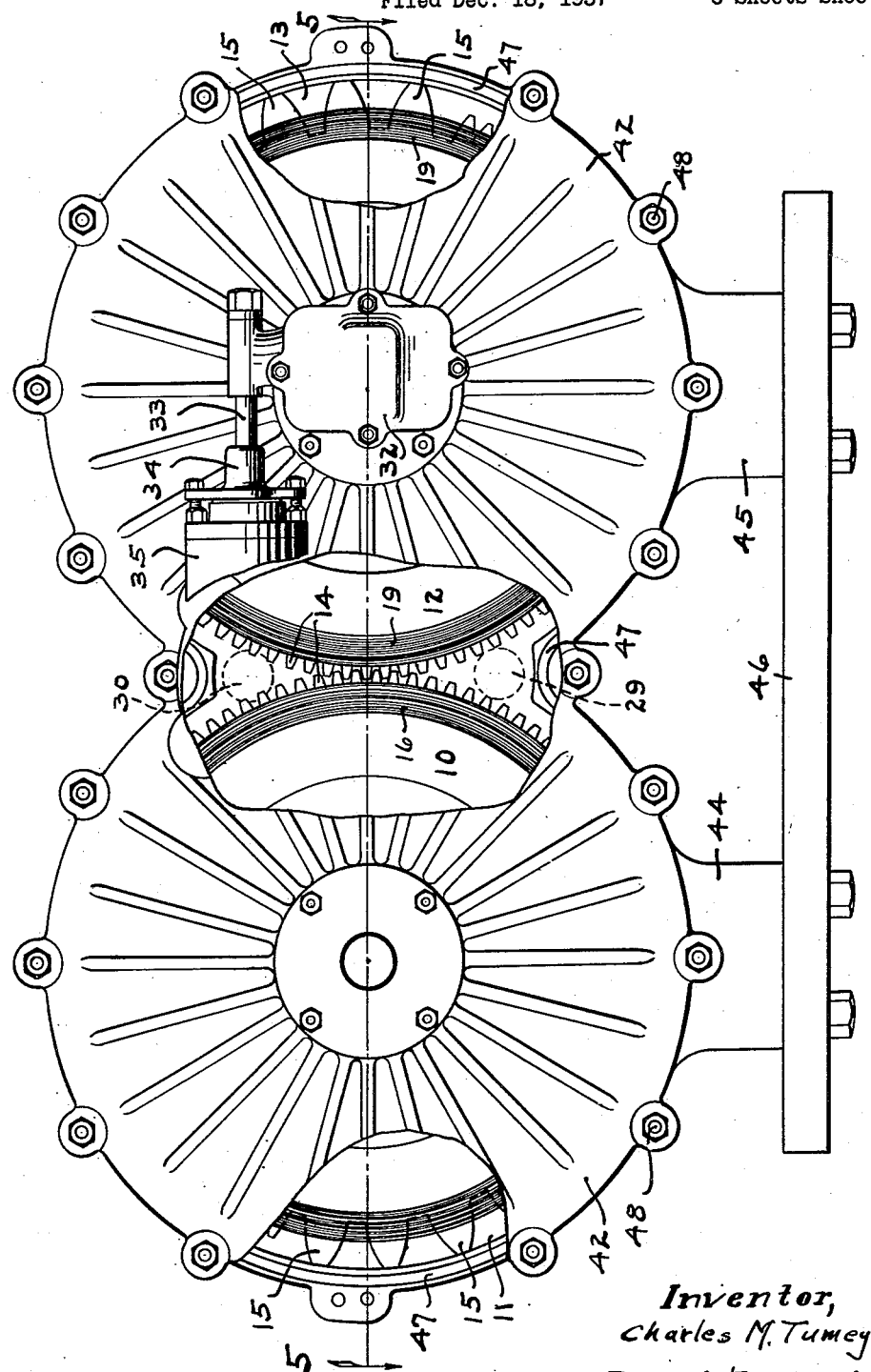

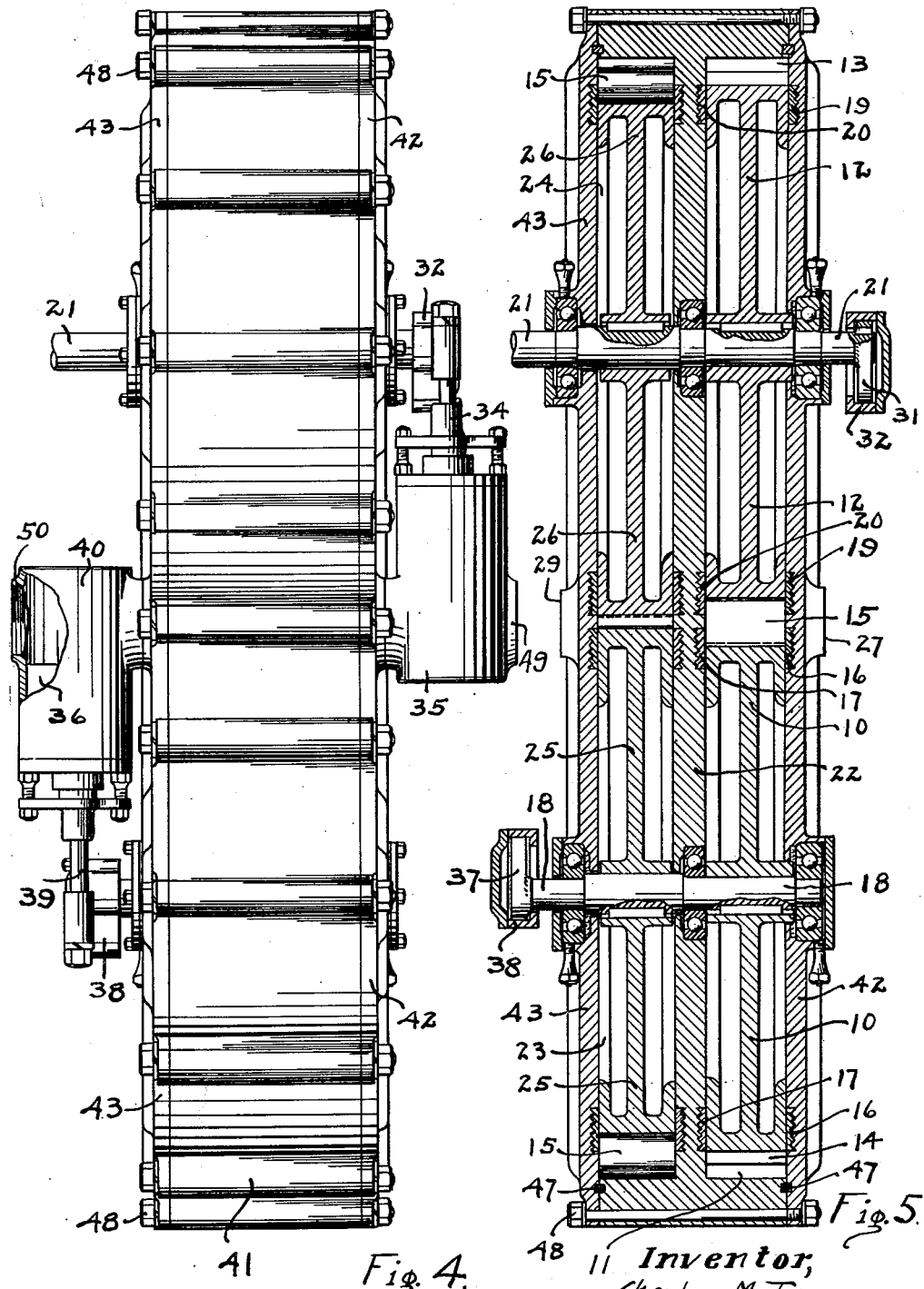

2,211,447

UNITED STATES PATENT OFFICE 2,211,447

ROTARY ENGINE

Charles M. Tumey, Indianapolis, Ind., assignor to Universal Corporation, a corporation of Indiana Application December 18, 1937, Serial No. 180,522

3 Claims. (Cl. 121—70)

This invention relates to a rotary engine of the pressure type in which a fluid medium is directed into an enclosed, sealed chamber through which a blade element carried by a rotor is moved by direct or expansive pressure of the medium.

A primary object of the invention is to provide an engine of the indicated type which will develop power without undue losses from friction set up by packing or sealing means, and at the same time, will have the fluid receiving chamber free from intercepting abutments or the like.

A further important object of the invention is to provide a very simple but extremely effective means for sealing of the fluid medium receiving chamber in such a manner that the revolving element such as the rotor is free from any braking action.

The invention lends itself to many uses such as a prime mover; a compressing unit such as may be used in refrigerating systems; a pump; supercharger in automotive and airplane fields; and kindred fields.

Figure 1:
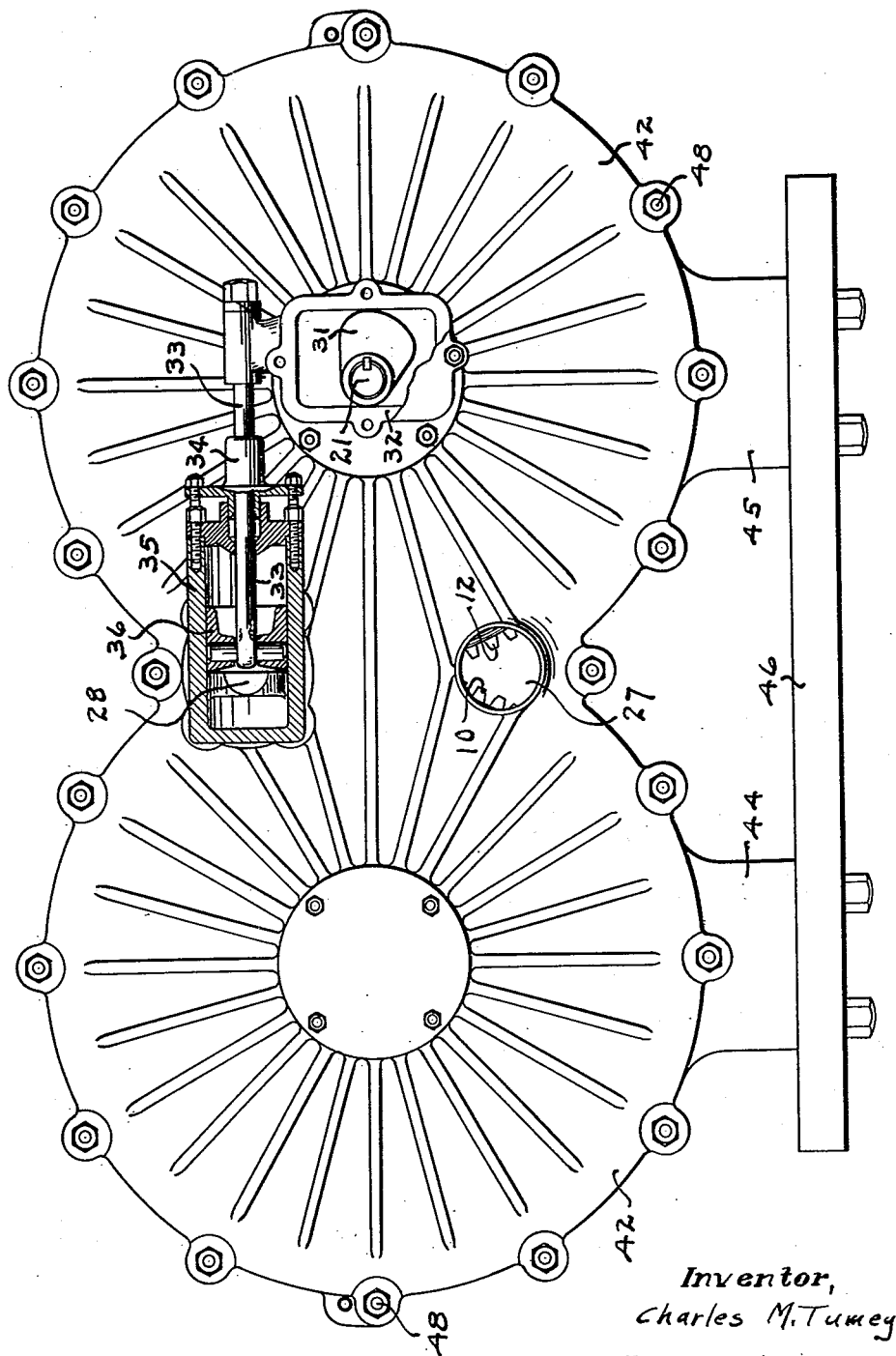

Many other objects and advantages in addition to those above indicated will become apparent to those versed in the art in the following description of the invention as illustrated by the accompanying drawings in which Fig. 1 is a front elevation with parts shown in section of a structure embodying the invention;

Fig. 2 a front elevation with parts shown in section indicating relative rotor positions;

Fig. 3 a similar view, but showing the rotor elements revolved substantially 180 degrees.

Figure 6:
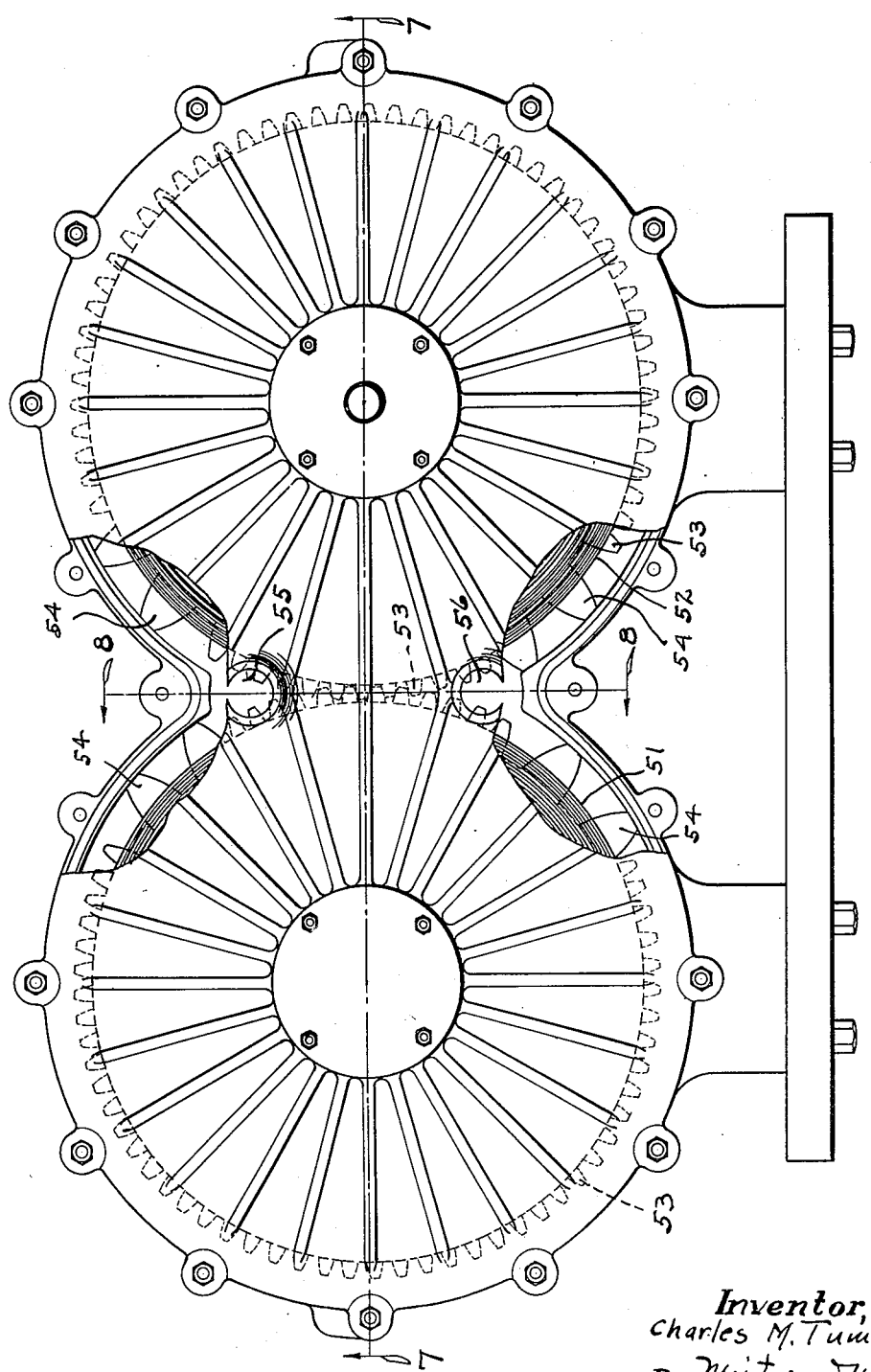

Fig. 4 a top plan view;

Fig. 5 a central horizontal section on the lines 5—5 in Figs. 2 and 3;

Fig. 6 a front elevation with parts shown in section of a modified form of structure;

Fig. 7 a central section on the line 7—7 in Fig. 6; and

Fig. 8 a vertical section on the line 8—8 in Fig. 6.

Like characters of reference indicate like parts throughout the several views in the drawings.

Referring first to that form of the invention as illustrated in Figs. 1-5, the invention is shown in its elemental form wherein one rotor 10 revolubly carried in its housing 11 meshes by peripheral teeth with a second rotor 12 revolubly carried in its housing 13. The housings 11 and 13 are provided with an opening therebetween through which the teeth of the respective rotors may mesh. The rotors 10 and 12 in the form herein shown are identical in size and shape so that a description of one will suffice for that of the other. The rotor 10 has the major portion of its periphery cut to form teeth 14. For example, without limiting the invention thereto, in one particular size, the rotor may have a 10-inch pitch diameter to have the teeth cut involute in form, 14 pitch tooth, remaining in full thickness on the pitch line.

Normally with these dimensions, there would be formed 140 teeth around the rotor. However for a distance of 28 teeth, the rotor is differently cut in that peripheral portion to present one or more teeth of larger proportions to project outwardly beyond the outside diameter line of the smaller teeth. In the one particular form herein shown, three such teeth 15 are formed by a generated one and three-fourths pitch cutter in such manner that as the rotor 10 is revolved in relation to rotor 12, the respective teeth 15 are preferably provided with clearance between the intermeshing teeth for reasons that will further be explained. The outside tooth diameter line of the teeth 14 is made to be such that there is left considerable clearance between that line and the side walls of the housing in which the rotor turns. The outer peripheral edges of the teeth 15 however are fitted to move in very close proximity to the inside cylindrical wall of the rotor housing in each case. This fitting is made sufficiently close to prevent any sizable loss of the fluid medium past the tooth within the housing and at the same time keep the tooth out of actual contact with the housing wall. By using more than one tooth 15 on each rotor, a plurality of seals is thus obtained as in the present instance, where three teeth 15 are employed requiring travel of the fluid medium over the three teeth before any escape of the fluid could be had.

The rotor 10 is provided with the annular face bands 16 anod 17 on its front and rear faces concentric with the rotor shaft 18 on which the rotor is fixed. Each of these bands 16 and 17 is provided with concentric serrations which interfit between like serrations formed in the back housing wall and the front housing cover. These serrations forming grooves therebetween may assume a number of different forms, one such form being herein shown as having 60 degree V-grooves, 3/32 pitch, five in number. These interfitting serrations are so formed as to be free from physical contact but sufficiently close so as to impede flow of fluid thereacross, thereby taking on the nature of labyrinth packing so as to prevent escape of fluid from the annular chamber formed between the periphery of the rotor and the surrounding cylindrical wall of the housing.

In like manner the rotor 12 is provided with the sealing bands 19 and 20 having serrations entering between like serrations formed within the housing cover and the housing back wall. The rotor 12 is fixed to the revoluble shaft 21. Both shafts 18 and 21 carried by suitable bearings, such as ball bearings herein shown, extend through the back wall 22 of the housings 11 and 13, the two housings herein shown as formed integrally. Housings 23 and 24 similar to the forward housings 11 and 13, have therein rotors 25 and 26 respectively, identical with rotors 10 and 12, the rotor 25 being fixed on the shaft 18 with its teeth 15 substantially 180 degrees from the position of the teeth 15 on the rotor 10; and the rotor 26 being fixed on the shaft 21 with its teeth 15 likewise substantially 180 degrees around from the position of the teeth 15 on the rotor 12.

Referring to Fig. 1, an opening 27 is formed in the front housing cover centrally between the rotors 10 and 12 and below their under lines of tooth contact. In the case of the prime mover this port 27 would serve as an exhaust. In similar manner, another port 28 is provided in the front housing cover to be centrally between the two rotors 10 and 12 but just above the lines of contact of the intermeshing teeth. The rear housings 23 and 24 are likewise provided with common central lower and upper ports 29 and 30. For the prime mover use of the invention, a valve is required to control admission of the operating fluid in timed sequence with the travel of the teeth 15. In this regard, reference is first made to Fig. 1 wherein is shown the shaft 21 as extending forwardly from the front housing cover plate to have a cam 31 fixed thereon within a box-like follower 32 engaging therearound so that turning of the cam 31 with the shaft 21, will reciprocate the follower 32 horizontally. This follower 32 has its upper end connected to a piston rod 33 which is carried through a suitable guide 34 forming part of a stuffing box. The piston rod 33 enters a valve chamber 35 herein shown as being cylindrical in shape and carries a piston valve 36 therewithin. The length of the rod 33 and of the piston 36 is made to be such in reference to the travel of the cam 31 that the piston 36 will be reciprocated over the port 28 to open and close it in timed relation with rotation of the shaft 21. In the same manner, the rear intake port 30 is opened and closed by an identical valve structure drivn from the shaft 18, Fig. 5, carrying its valve operating cam 37 within the follower 38 which in turn is connected to the rod 39 extending into the valve chamber 40.

As above indicated the two forward housings and the two rear housings are preferably combined within one casting 41 opening from the front and rear sides to permit assembly of the respective rotors therein and covered by the front and rear covers 42 and 43, Fig. 4. The combined housing 41 may be mounted in any suitable manner such as by the pedestals 44 and 45 secured to a common base 46, Fig. 3. The covers 42 and 43 are of course attached to the casting 41 in such manner as will seal the chambers therewithin such as by a packing ribbon 47 extending entirely around the casting 41 on both faces, bolts 48 being employed to compressively engage the respective covers against the packing.

In operation, the operating fluid, steam for example, is admitted to the valve chambers 35 and 40 behind the pistons 36 through the entrance of the respective nipples 49, 50, Figs. 4 and 5, to have the steam flow alternately through the front port 28 and the rear port 30. Referring to Fig. 3, the front elevation wherein the teeth 15 are in their diametrically opposed positions, steam would be flowing through the front valve, through the port 28, Fig. 1, and into the space above the meshed teeth 14 of the two rotors. From this entrance zone, steam would flow in two directions, one counterclockwise over the top of the rotor 10, and the other direction, clockwise over the top of the rotor 12. There is nothing to impede this flow of steam in these two directions until the steam strikes the first appearing tooth 15. Continued admittance of steam will of course set up pressure behind these teeth 15, the first appearing tooth on each of the rotors, and thereby set in motion those two rotors. Both rotors must turn at the same speed since they are tied together through the meshing of the gears 14. Steam may be continuously admitted through the port 28 to follow around behind the receding teeth 15, or the valve may be operated to cut off flow and allow the steam to expand behind the teeth 15 as may be most desirable. In any event pressure will be exerted to cause the rotors 10 and 12 to turn to that position indicated in Fig. 2 wherein the steam behind the teeth 15 is allowed to enter through the port 30 to travel around over their upper sides against the teeth 15 to cause rotation of those two rotors likewise. The steam thus applied is allowed to escape through the exhaust port 29 when the teeth have been pushed around sufficiently far to assume that position as indicated by the forward rotor in Fig. 2. In other words the shaft 18 having the rotors 10 and 25 fixed thereto will have two impulses per revolution as will also the shaft 21 which carries the rotors 12 and 24.

It is to be noted that when the teeth 15 of the respective forward rotors 10 and 12 mesh as in Fig. 2, the teeth 14 of the two rear rotors 24 and 25 are meshed. Therefore it is to be seen that at all times there is a control of the respective circumferential positions of the four rotors through intermeshing of teeth 14 irrespective of the meshing between teeth 15. Therefore the teeth 15 may be made so as to be actually free from pressure or contact one against the other and thus remove liability of noise that might otherwise arise when one such tooth engaged the other.

It is further to be seen that in the description so far given of the invention, there is actually no rubbing contact between any of the rotors and the enclosing housing but at the same time very effective seals are provided against escape of the fluid employed. As above indicated, the elemental form of the invention would consist of but one tooth 15 on each of the four rotors but as an added factor against leakage of the fluid around therepast, a plurality of such teeth herein shown as three in number may be employed, providing in effect a labyrinth packing again.

Referring now to that modification of the invention as illustrated in Figs. 6–8, a single pair of rotors 51 and 52 are employed having minor teeth 53 about the major peripheral length of each rotor and the major teeth 54. In this form however, instead of having but one set of major teeth on each rotor, two sets are provided as indicated in Fig. 6, the spacing between each set on one rotor being that which will bridge the opening between the respective rotor housings through which the rotor teeth extend and intermesh. In this space between the two sets of major teeth on each rotor, appears a continuation of the minor teeth 53, these minor teeth within this spacing serving as sealing means to prevent leakage of the fluid medium between the upper and lower ports 55, 56, Fig. 6.

While not necessarily so, since there may be continuous driving relation between the two rotors through the major and minor teeth, the shafts 56' and 57 on which the respective rotors 51 and 52 are fixed are preferably tied together by intermeshed gear wheels 58 and 59, Fig. 7. These gear wheels 58 and 59 would be carried under a separate cover 60 on the rear side of the motor so that they could be run in oil if desired. By employing the gear wheels 58 and 59 with the same size of teeth continuously therearound the large or major teeth 54 may be made to intermesh between opposing teeth without actual contact, and that is the purpose of employing these gears 58 and 59, through which gears the teeth 54 on the two rotors will be brought around in timed relation so as to mesh without clashing.

In this modified form of the invention, valves are not required. For example supposing the moving fluid be entered through the port 55, Fig. 6, pressure will be exerted at once against the teeth 54 first appearing around from that opening on the upper sides of the two rotors. The fluid flowing through the port 55 will continue to exert its pressure against these teeth 54 until the next appearing set of teeth coming up therebetween travel past the port opening 55 to intercept that flow of fluid and have it exert its pressure against these second set of teeth. The intermeshing minor gears 53 prevent the fluid from flowing backwardly between the rotors. Fluid medium trapped between the two sets of major teeth escapes through the exhaust port 56.

This particular form of the invention is well adapted for use as a supercharger since air or a fuel mixture may be drawn in through the port 55, assuming the right hand rotor to be turning clockwise, and such fluid exhausted through the port 56 against any suitable head.

While the invention has been described in the particular forms above indicated, it is obvious that structural variations may be employed, such as by employing additional sets of major teeth for added impulses per revolution, without departing from the spirit of the invention, and I therefore do not desire to be limited to such precise forms beyond the limitations as may be imposed by the following claims.

I claim:

1. In a rotary engine device, a pair of juxtaposed cylindrical housings opening on a chordal plane one into the other, a rotor revolubly mounted in each cylinder, minor projecting teeth around each rotor periphery having an outside diameter less than that of the inside cylinder walls thereby providing annular chambers in each housing between the rotors and the housing walls, and a plurality of adjacent major teeth on each rotor extending into running fit with its cylinder wall, whereby said major teeth form in effect blades on its rotors, said minor teeth being intermeshed between the said cylinders in proper relation to cause the major teeth of one rotor to mesh between the major teeth of the other rotor and follow across said opening and have said minor teeth again come into mesh therebehind, both sets of said minor and major teeth extending across the periphery of their respective rotors, and said housings being provided with a port in common above the meshing zone of said gears and a port in common therebelow, each of said ports providing common openings to and from said annular chambers in both of said housings, and labyrinth packing between the rotor ends and their respective cylinder walls.

2. In a rotary engine device, a pair of juxtaposed cylindrical housings opening on a chordal plane one into the other, a rotor revolubly mounted in each cylinder, minor projecting teeth around each rotor periphery having an outside diameter less than that of the inside cylinder walls thereby providing annular chambers in each housing between the rotors and the housing walls, and a plurality of adjacent major teeth on each rotor extending into running fit with its cylinder wall, whereby said major teeth form in effect blades on its rotors, said minor teeth being intermeshed between the said cylinders in proper relation to cause the major teeth of one rotor to mesh between the major teeth of the other rotor and follow across said opening and have said minor teeth again come into mesh therebehind, both sets of said minor and major teeth extending across the periphery of their respective rotors, and said housings being provided with a port in common above the meshing zone of said gears and a port in common therebelow, each of said ports providing common openings to and from said annular chambers in both of said housings, auxiliary means maintaining said rotors in fixed relative rotative positions while said major teeth of one rotor traverse those of the other rotor, and labyrinth packing between the rotor ends and their respective cylinder walls.

3. In a rotary engine device, a pair of juxtaposed cylindrical housings opening on a chordal plane one into the other, a rotor revolubly mounted in each cylinder, minor projecting teeth around each rotor periphery having an outside diameter less than that of the inside cylinder walls thereby providing annular chambers in each housing between the rotors and the housing walls, and a plurality of adjacent major teeth on each rotor extending into running fit with its cylinder wall, whereby said major teeth form in effect blades on its rotors, said minor teeth being intermeshed between the said cylinders in proper relation to cause the major teeth of one rotor to mesh between the major teeth of the other rotor and follow across said opening and have said minor teeth again come into mesh therebehind, both sets of said minor and major teeth extending across the periphery of their respective rotors, and said housings being provided with a port in common above the meshing zone of said gears and a port in common therebelow, each of said ports providing common openings to and from said annular chambers in both of said housings, and auxiliary means maintaining said rotors in fixed relative rotative positions irrespective of contact between said major teeth, said auxiliary means comprising a second pair of like rotors and housings mounted in parallel relation with said first housing, a shaft extending from one of said first housings into a corresponding one of the second pair of housings, a second shaft extending from the other of said first housings into the corresponding one of the second pair, the rotors in the respective housings being fixed to the shafts entering therein, the rotors on each shaft being mounted in relation to each other so as to have a major tooth of one circumferentially spaced around from a like tooth of the other rotor on that shaft, whereby the minor teeth of one set of rotors will always be in mesh while the major teeth of the other rotors are passing each other, and labyrinth packing between the rotor ends and their respective cylinder walls.

CHARLES M. TUMEY.